United States Patent
Tassi et al.

(10) Patent No.: US 12,356,317 B2
(45) Date of Patent: *Jul. 8, 2025

(54) MM WAVE COMMUNICATION MESH NETWORK

(71) Applicant: Blu Wireless Technology Limited, Bristol (GB)

(72) Inventors: Andrea Tassi, Bristol (GB); Stuart Andrew Ryan, Bristol (GB); Peter Jonathon Legg, Bristol (GB); Raymond Mark McConnell, Bristol (GB)

(73) Assignee: Blu Wireless Technology Limited, Bristol (GB)

( * ) Notice: Subject to any disclaimer, the term of this patent is extended or adjusted under 35 U.S.C. 154(b) by 423 days.

This patent is subject to a terminal disclaimer.

(21) Appl. No.: 17/964,075

(22) Filed: Oct. 12, 2022

(65) Prior Publication Data
US 2024/0129834 A1     Apr. 18, 2024

(51) Int. Cl.
*H04W 4/00*     (2018.01)
*H04W 24/02*    (2009.01)
*H04W 48/16*    (2009.01)

(52) U.S. Cl.
CPC ........... *H04W 48/16* (2013.01); *H04W 24/02* (2013.01)

(58) Field of Classification Search
CPC .............................. H04W 48/16; H04W 24/02
USPC .......................................................... 455/434
See application file for complete search history.

(56) References Cited

U.S. PATENT DOCUMENTS

| 2020/0008129 A1 | 1/2020 | Abouelseoud |
| 2020/0077326 A1 | 3/2020 | Abouelseoud |

FOREIGN PATENT DOCUMENTS

EP         2870801 B1      3/2021

*Primary Examiner* — Temica M Beamer
(74) *Attorney, Agent, or Firm* — Optimus Patents US, LLC (57) ABSTRACT

A mm wave radio communication mesh network comprises a wireless node apparatus comprising a plurality of wireless modems (103) and a configuration controller (307) arranged to perform a node configuration arranged to configure the wireless modems (103) as access point wireless modems or non-access point wireless modems. The configuration controller (307) controls a set of wireless modems to scan for access point beacons and determines a first wireless modem that has detected an access point beacon from a first target access point wireless modem. It then configures the first wireless modem as a non-access point wireless modem and controls it to connect to the first target access point modem. If the connection is successful, the configuration controller (307) proceeds to configure another wireless modem as an access point wireless modem.

20 Claims, 5 Drawing Sheets

MM WAVE COMMUNICATION MESH NETWORK

FIELD OF THE INVENTION

The invention relates to communication in a mm wave radio communication mesh network, and in particular, but not exclusively to using mm wave radio communication to provide a high capacity backhaul or ad-hoc network.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board buses etc.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

In particular, providing sufficient air interface capacity to support high rate communication with moving vehicles, such as for supporting Internet access to a high number of passengers on a bus, is a difficult challenge.

An advantage of using higher frequencies and mm wave radio communications is that it tends to allow large bandwidths to be allocated to communications. Further, the frequency bands tend to be less used and interference tends to be spatially limited to shorter ranges. Therefore, mm wave radio communication tends to offer the possibility of reliable high communication capacity which is highly advantageous in many situations. However, the reduced range and associated complications tend to restrict the usability in many practical applications. Accordingly, mm wave radio communication systems have been proposed for a number of specific applications.

A suggested application Fixed Wireless Access (FWA) or backhaul network(s) which provide network connectivity between end-devices (customer-provided equipment, small-cells, Wi-Fi APs, CCTV cameras, etc.) and a core network. Due to the range and line-of-sight (LOS) requirement of mmWave, such a network may comprise multiple Distribution Sites (DSs) equipped with multiple modems for radio communications connected to steerable antennas to achieve the desired coverage. The end-device may be installed at a dedicated client site (CS) with a single modem or may e.g. be co-located at a distribution site. Another example is to provide an ad-hoc high capacity communication network.

Such communication systems may in many cases particularly be mesh communication systems which are based on connections being formed directly, dynamically and non-hierarchically between different nodes.

A particular challenge of many such mm wave radio communication systems is how to configure and adapt the system to different constellations and node configurations. For example, it is a challenge to dynamically adapt mm wave radio communication mesh networks to addition or removal of nodes such that reliable and efficient communication can be maintained, and operation can be optimized as much as feasible.

Hence, an improved operation for a mm wave radio communication mesh network would be advantageous. In particular, an approach that allows improved operation, improved reliability, increased flexibility, facilitated implementation, facilitated and/or improved operation, improved resource utilization and in particular air interface resource utilization, facilitated and/or improved resource management, improved and/or facilitated adaptation to changed configuration of the mm wave radio communication system such as due to inclusion of new nodes, removal of nodes and/or movement of nodes, improved and/or facilitated configuration of a mm wave radio communication system, improved and/or facilitated designation of modems (as access points or non-access points), improved support for communication within the mm wave radio communication system and/or for supporting other networks or communication systems would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided wireless node apparatus for a node a mm wave radio communication mesh network, the wireless node apparatus comprising: a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configurable as an access point wireless modem or as a non-access point wireless modem, a wireless modem configured as an access point wireless modem being arranged to form mm wave radio communication links with non-access point wireless modems of other nodes and being arranged to transmit a beacon signal, and a wireless modem configured as a non-access point wireless modem being arranged to form mm wave radio communication links with access point wireless modems of other nodes and not being arranged to transmit a beacon signal; a configuration controller arranged to perform a node configuration comprising: controlling a set of wireless modems of the plurality of wireless modems to scan for access point beacons; determining a first wireless modem from the set of wireless modems, the first wireless modem being a wireless modem having detected an access point beacon from a first target access point wireless modem; controlling the first wireless modem to connect to the first target access point modem, the first wireless modem being configured as a non-access point wireless modem; and configuring at least one wireless modem of the plurality of wireless modems other than the first wireless modem as an access point wireless modem in response to the first wireless modem establishing connection with the first target access point modem.

The invention may provide improved and/or facilitated operation and/or improved performance for a mm wave radio communication mesh network/communication system. It may provide improved node and wireless modem configuration typically allowing improved reliability and communication performance. The approach may in many scenarios allow automatic (or semi-automatic) configuration of a mm wave radio communication mesh network. In many scenarios, it may allow a mm wave radio communication mesh network/node to adapt to changes in the network configuration.

The approach may in many scenarios allow for a local process to adapt a local node resulting in improved configuration of the mm wave radio communication mesh network as a whole. The approach may allow low complexity and efficient operation and may e.g. reduce the requirement or use of dedicated and specific operations to coordinate and liaise with other nodes. A local node based adaptation/reconfiguration may allow improved overall performance.

The approach may be particularly suitable for mm wave radio communication mesh networks as it has been found to provide highly advantageous results with mm wave radio communication links, characterized by having relatively short ranges and typically requiring line of sight communication links.

The approach may, in particular, provide efficient and reliable communication in many scenarios and embodiments, and may in many embodiments provide more efficient utilization of the available air interface resource. The approach may in many embodiments provide improved consistency and reduced data interruption and/or performance degradation.

The approach may in particular allow more reliable and/or improved and/or facilitated access point/non-access point configuration of a mm wave radio communication mesh network.

Non-access point wireless modems of other nodes may be wireless modems of other nodes than the node of the wireless node apparatus which are configured as non-access point wireless modems.

Access point wireless modems of other nodes may be wireless modems of other nodes than the node of the wireless node apparatus which are configured as access point wireless modems.

A wireless modem configured as a non-access point wireless modem may be arranged to only connect to one access point wireless modem at a time. A wireless modem configured as a non-access point wireless modem may be arranged to only support one connection at a time.

A wireless modem configured as an access point wireless modem may be arranged to connect to more than one non-access point wireless modem at a time. A wireless modem configured as an access point wireless modem may be arranged to support multiple connections at a time.

A wireless modem configured as an access point wireless modem may be arranged to form mm wave radio communication links only with non-access point wireless modems of other nodes.

A wireless modem configured as a non-access point wireless modem may be arranged to form mm wave radio communication links only with access point wireless modems of other nodes.

The wireless node apparatus and the plurality of wireless modems may be co-located. The wireless node apparatus and the plurality of wireless modems may located on a single site. A maximum distance between wireless node apparatus and all wireless modems of the plurality of wireless modems located on a single site may be less than 50 m, 20 m, 10 m, 5 m, 2 m or even 1 m in some scenarios.

In accordance with an optional feature of the invention, determining the first wireless modem comprises selecting the first wireless modem and the first target access point out of a plurality of pairs of wireless modems and target access points for which a beacon has been detected.

In some embodiments, determining the first wireless modem comprises selecting the first wireless modem and the first target access point from a plurality of beacon detections between the set of wireless modems and access point wireless modems of other nodes.

Such selections may provide improved performance and/or operation in many scenarios and embodiments.

In accordance with an optional feature of the invention, a selection criterion for selecting the first wireless modem and the first target access point includes a consideration of a signal strength of detected beacons.

In accordance with an optional feature of the invention, a selection criterion for selecting the first wireless modem and the first target access point includes a consideration of a loading of nodes of at least one of the access point wireless modems from which a beacon has been detected.

In many embodiments, the beacon from one or more of the access point wireless modems may comprise data indicating a loading of the access point wireless modem. For example, a number of connections or wireless modems supported by the access point wireless modem may be indicated by data transmitted by the beacon.

In some embodiments, a selection criterion for selecting the first wireless modem and the first target access point includes a consideration of a number of hops from the access point wireless modems to a given node.

The given node may specifically be a gateway node to another network/a core network. The given node may be a Point of Presence (PoP) node.

In some embodiments, a selection criterion for selecting the first wireless modem and the first target access point includes a consideration of a latency metric for the access point wireless modems.

The latency metric may be indicative of a latency for communication between access point wireless modems and another node of the mesh network. The another node may be a given node, and specifically the given node may be a gateway node to another network/a core network. The given node may be a Point of Presence (PoP) node.

In accordance with an optional feature of the invention, the set of wireless modems comprises all wireless modems of the node that are arranged to communicate using mm wave radio communication links formed with wireless modems of other nodes.

In accordance with an optional feature of the invention, the set of wireless modems comprises more than one of the wireless modems of the plurality of wireless modems.

In accordance with an optional feature of the invention, the set of wireless modems comprises only one wireless modem of the plurality of wireless modems, and the configuration controller, in response to no connection being formed between first wireless modem and the first target access point for the wireless modem, is arranged to: control the different wireless modem to connect to a second target access point modem in response to a detection of a beacon from the second target access point modem, the different wireless modem being configured as a non-access point wireless modem; and configure at least one wireless modem of the plurality of wireless modems other than the different wireless modem as an access point wireless modem in response to the different wireless modem establishing connection with the second target access point modem.

The approach may allow an efficient iterative process considering one wireless modem at a time.

The first target access point and the second target access point may be the same target access point.

In accordance with an optional feature of the invention, the configuration controller, in response to no connection being formed between first wireless modem and the first target access point for the wireless modem, is arranged to: select a second wireless modem from the set of wireless modems, the second wireless modem being a wireless modem having detected a beacon from a second target access point wireless modem, the second wireless modem being different than the first wireless modem; control the second wireless modem to connect to the second target access point modem, the second wireless modem being configured as a non-access point wireless modem; and configuring at least one wireless modem of the plurality of wireless modems other than the second wireless modem as an access point wireless modem in response to the second wireless modem establishing connection with the second target access point modem.

The first target access point and the second target access point may be the same target access point.

In accordance with an optional feature of the invention, the configuration controller is arranged to configure all wireless modems of the plurality of wireless modems other than the first wireless modem as an access point wireless modem in response to the first wireless modem establishing connection with the first target access point.

In accordance with an optional feature of the invention, the configuration controller is arranged to configure a subset of wireless modems of the plurality of wireless modems other than the first wireless modem as an access point wireless modem in response to the first wireless modem establishing connection with the first target access point.

In accordance with an optional feature of the invention, the configuration controller is arranged to initiate the node configuration in response to at least one of: a switching on of the wireless node apparatus; a switching on of a wireless modem of the plurality of wireless modems; a user input; a time interval expiring; a loss of all connections to access point wireless modems of other nodes; a loss of all connections to other nodes.

In accordance with an optional feature of the invention, the configuration controller is arranged to allocate a frequency channel to a wireless modem of the plurality of wireless modems when being configured as an access point wireless mode.

In accordance with an optional feature of the invention, the configuration controller is arranged to select the frequency channel in response to frequency channels used by wireless modems of the plurality of wireless modems configured as non-access point wireless modems.

In accordance with an optional feature of the invention, the configuration controller is arranged to select the frequency channel as a frequency channel that is not used by wireless modems of the plurality of wireless modems configured as non-access point wireless modems.

In accordance with an optional feature of the invention, the configuration controller is arranged to select the frequency channel to minimize a number of reuses of frequency channels for the wireless node.

In accordance with an optional feature of the invention, the configuration controller is arranged to select the frequency channel in response to frequency channels of detected access point beacons.

In accordance with another aspect of the invention, there is provided a mm wave radio communication mesh network comprising a plurality of wireless nodes of which one node is a gateway node to a network.

In accordance with an optional feature of the invention, the mm wave radio communication mesh network comprises a gateway node arranged to couple the mm wave radio communication mesh network to another network, the gateway node comprising a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configured as an access point wireless modem.

In accordance with another aspect of the invention, there is provided a method of operation for a wireless node of a mm wave radio communication mesh network, the wireless node comprising: a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configurable as an access point wireless modem or as a non-access point wireless modem, a wireless modem configured as an access point wireless modem being arranged to form mm wave radio communication links with non-access point wireless modems of other nodes and being arranged to transmit a beacon signal, and a wireless modem configured as a non-access point wireless modem being arranged to form mm wave radio communication links with access point wireless modems of other nodes and not being arranged to transmit a beacon signal; and the method comprising: controlling a set of wireless modems of the plurality of wireless modems to scan for access point beacons; determining a first wireless modem from the set of wireless modems, the first wireless modem being a wireless modem having detected an access point beacon from a first target access point wireless modem; controlling the first wireless modem to connect to the first target access point modem, the first wireless modem being configured as a non-access point wireless modem; and configuring at least one wireless modem of the plurality of wireless modems other than the first wireless modem as an access point wireless modem in response to the first wireless modem establishing connection with the first target access point modem.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
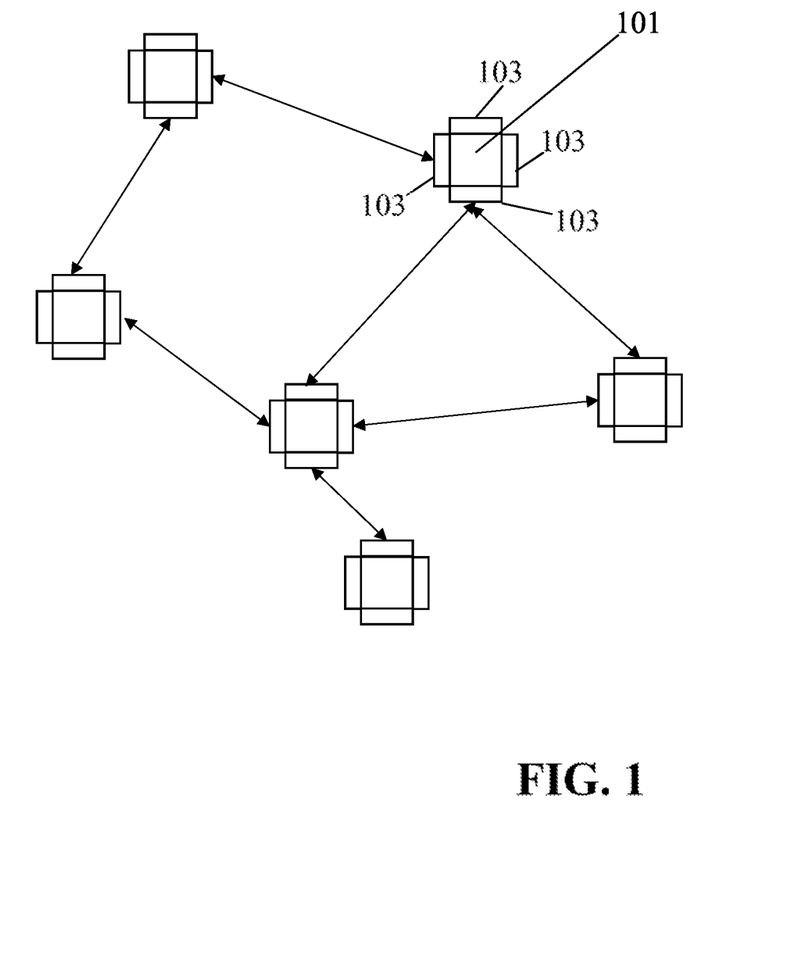
FIG. 1 illustrates an example of elements of a mm wave radio communication mesh network in accordance with some embodiments of the invention.

FIG. 1 illustrates an example of a mm wave radio communication mesh network comprising a plurality of nodes 101 (for clarity reference signs are shown for only one node). Each of the nodes comprises a plurality of wireless modems 103 that are arranged to communicate using mm wave radio communication links formed with wireless modems of other nodes.

Each of the wireless modems 103 is arranged to communicate using directional antennas and each of the wireless modems comprise a directional antenna arrangement that forms a directional beam.

In many embodiments, the wireless modems may comprise a beam controller which is arranged to steer the main beam of an electronically steerable beamforming directional antenna in a desired direction. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam controller which is arranged to adapt the individual antenna phase and amplitude coefficients to direct the main beam towards the relevant access points. As another example, more mechanical solutions may be used. For example, a horn antenna having a directional radiation pattern may be used.

The beams of the directional antennas of the wireless modems 103 of a node 101 are formed in different directions thereby allowing the node to communicate effectively with other wireless modems that are in different directions with respect to the node. The plurality of wireless modems 103 of a node may specifically be used to form one or more sectors where each sector is associated with a modem connected to a steerable directional antenna for mmWave. In the specific example of FIG. 1, each node comprises four wireless modems each supporting a 90° sector (or possibly a larger angle to ensure an overlap). The direction of the beams of the different modems are accordingly 90° offset with respect to each other. However, it will be appreciated that in many embodiments, different nodes may have a different number of wireless modems and beams, including both more or fewer than four wireless modems.

The network of FIG. 1 is a mm wave radio communication mesh network where nodes are arranged to connect directly to other nodes and the interconnections are formed in a peer-to-peer and non-hierarchical approach. A mmwave mesh network may specifically be a network where the communication path between any two nodes (or from any node and an external node (this is a node outside the mesh network)) may exploit more than one mmwave link. Thus, there may be multiple mmwave hops in a communication path across the mesh, which is known as multi-hop. In a multi-hop path, intermediate nodes are used to forward or relay packets received on one mmwave modem (or interface), transmitting them on a second mmwave interface.

In the mm wave radio communication mesh network, the nodes accordingly form connections/links between each other via the wireless modems and typically connections may be formed with neighbor nodes thereby forming a mesh of interconnected nodes in which data packets can be routed between any two nodes.

In the example, of FIG. 1, the mm wave radio communication mesh network may provide interconnections between the nodes thereby allowing any communication device directly connected to one node to communicate with any communication device connected to another node.

In many embodiments, one or more nodes may include functionality for coupling a communication device to the node. Such a communication device may for example be a non-mm wave radio access point, such as a Wi-Fi access point. In other examples, other communication devices may be coupled to some nodes, such as e.g. a direct wired coupling to a user device.

Thus, the mm wave radio communication mesh network may provide an interconnection network allowing communication devices to communicate with each other via the mesh connections and the nodes.

In the example of FIG. 1, such an arrangement may be a symmetric arrangement where all nodes may be equivalent. In some embodiments, some nodes may be considered to be client nodes that couple to communication devices whereas other nodes may perform only distribution within the mm wave radio communication mesh network, i.e. they only function as nodes of the mm wave radio communication mesh network and do not directly couple or connect to any other communication devices.

Figure 2:
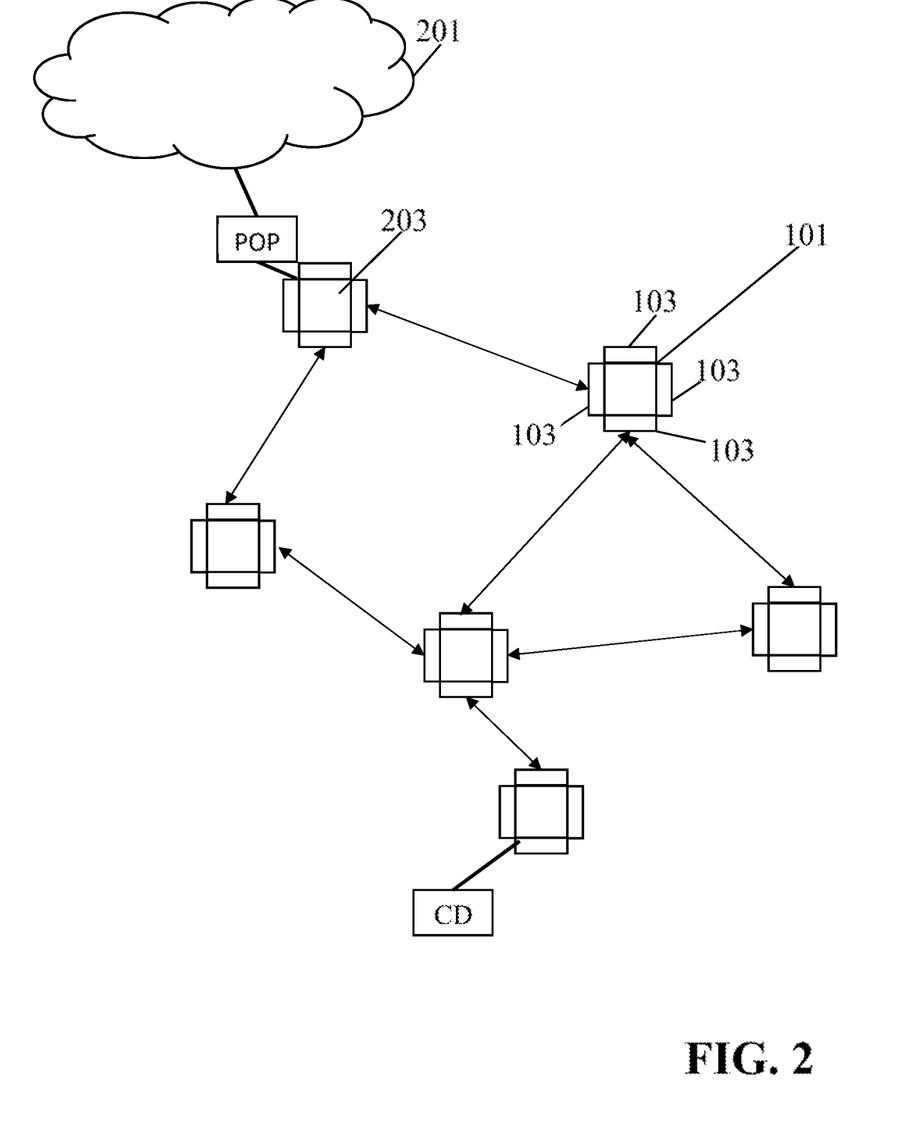
FIG. 2 illustrates an example of elements of a mm wave radio communication mesh network in accordance with some embodiments of the invention.

In other examples, such as illustrated in FIG. 2, the mm wave radio communication mesh network may be a network that is arranged to provide a coupling of client devices to another network 201. Specifically, the mm wave radio communication mesh network may be a back haul network that provides communication coupling from a number of access points/base stations that are not mm wave radio communication devices, but which may e.g. be Wi-Fi or cellular base stations. The mm wave radio communication mesh network may in such an example provide a backhaul communication function connecting the Wi-Fi access points/cellular base stations to a core network 201.

In some embodiments, the mm wave radio communication mesh network may accordingly comprise at least one node 203 that is a gateway node to another network 201, such as a core network or fixed network.

In some embodiments, the mm wave radio communication mesh network may be a mobile network where the individual nodes may move, and thus the position of the nodes relative to each other may dynamically change. In other embodiments, the mm wave radio communication mesh network may be a fixed network where nodes may be added and removed but are generally considered to be static and geographically fixed. The mm wave radio communication mesh network may in many embodiments specifically be a Fixed Wireless Access (FWA) backhaul network, e.g. supporting Wi-Fi access points or cellular base stations.

The wireless modems of the mm wave radio communication mesh network may be configured as an access point or as a non-access point wireless modem. An access point is arranged to transmit a beacon transmission allowing it to be detected by other wireless modems. The beacon transmission may include various data that allows other wireless modems to adapt communication parameters allowing them to access and communicate with the access point wireless modem. A wireless modem configured as a non-access point wireless modem in the mm wave radio communication mesh network in contrast does not transmit any beacon signal and is not detectable by other wireless modems scanning for a beacon signal.

In the system, wireless modems configured as non-access point wireless modems are arranged to access and communicate with wireless modems configured as access point wireless modems. In addition, non-access point wireless modems may communicate directly with other non-access point wireless modems if these are connected/attached/associated with the same access point wireless modem. However, access point wireless modems cannot form direct links between each other, i.e. one access point wireless modem cannot form a direct link to another access point wireless modem.

Furthermore, in the mm wave radio communication mesh network, access point wireless modems are arranged to control air interface resource allocation for the non-access point wireless modems that are connected to/attached to/associated with the access point wireless modem. Specifically, the access point wireless modem is in many embodiments arranged to allocate communication time intervals to the non-access point wireless modem connected to the access point wireless modem, including allocating time intervals to any direct communications between two non-access point wireless modems attached to the access point wireless modem.

Thus, in the example, the wireless modems are configured into access point wireless modems and non-access point wireless modems with access point wireless modems being detectable by non-access point wireless modems by detection of the transmitted beacon signals and with the access point wireless modem controlling resource for the non-access point wireless modems attached to it.

In many embodiments, the mm wave radio communication mesh network may use a plurality of frequency channels and each access point wireless modem is allocated a subset, and typically only one, of these frequency channels. Each frequency channel may have a large bandwidth, such as e.g. a bandwidth of hundreds of MHz or exceeding one GHz. In many cases, an access point wireless modem is arranged to divide such a frequency channel into a plurality of time slots that may be allocated to communication between a specific non-access point wireless modem and the access point wireless modem, or between two non-access point wireless modems communicating directly with each other. The allocation and communication of time slots to individual communications is performed via the access point wireless modem.

Thus, the wireless modems may be grouped into service sets that operate on a single mmWave radio channel with each set comprising a controller modem (an access point wireless modem) that establishes mmWave links with one or more "slave" modems (non-access point wireless modems) in the set.

As a specific example of the mm wave radio communication mesh network, a node may be included which can directly reach/connect to an external network via a wired link Such a node is often referred to as a Gateway Node. The Gateway Node typically connects to a piece of networking equipment, such as a network switch or router, that acts as Point-of-Presence (PoP) to the core network. The Gateway Node may also be considered to be the PoP.

The nodes may also be referred to as Distribution Sites (DS) or Client Sites (CS) where the former is considered a node that only form links with other nodes of the mm wave radio communication mesh network and where the latter is a node that also connects to a client device (such as a Wi-Fi access point or cellular base station). The DSs may form wireless network connections with their peers to establish the mesh and the CSs may couple the mesh to client devices.

A set of modems which communicate directly via the wireless medium and include an access point wireless modem and one or more non-access point wireless modems may be referred to as a basic service set (BSS). Typically, a BSS operates on a single channel.

A wireless modem can in the specific example be either an access point wireless modem, in some embodiments referred to as PCP/AP (the primary device in a BSS) or a non-access point wireless modem, in some embodiments referred to as a non-PCP/AP. In the example each BSS has exactly one PCP/AP and may have multiple non-PCP/AP devices. The PCP/AP is responsible for controlling the allocation of access periods within the BSS. Wireless network links are formed within a BSS; a PCP/AP cannot form a direct wireless network link with another PCP/AP; and a non-PCP/AP cannot form a direct wireless network link with another non-PCP/AP which is not a member of the same BSS. Network links can be formed at a DS between modems which are connected to the same switch or router installed at that site.

The hardware of each modem device can be identical, and the adoption of role (PCP/AP or non-PCP/AP) can be purely a software configuration item.

In the mm wave radio communication mesh network, at least some, and typically all, of the wireless modems are configurable modems that can by configured to be access point wireless modems or be non-access point wireless modems. The wireless modems may include functionality that include circuitry for receiving and transmitting radio signals using a beamforming antenna arrangement. The signals may be converted between the analog domain and the digital domain at a suitable frequency band, such as at base band, an intermediate frequency band, or potentially at an RF frequency. The digital signals may be processed by a processor such as a digital signal processor that is connected to memory and which has input output functions, as will be known to the skilled person. The described functions may be implemented as executable code that is executed by the processor. The executable code may include code that implements both the functions of an access point wireless modem and functions of a non-access point wireless modem. Typically, such code may include some functions and routines that are common for both configurations and some that are different depending on whether the wireless modem is configured as an access point wireless modem or a non-access point wireless modem. The wireless modem may be arranged to switch between an access point wireless modem mode where the functions and routines that are common or specific to the access point wireless modem function are enabled and a non-access point wireless modem where the functions and routines that are common or specific to the non-access point wireless modem function are enabled. The wireless modems may thus be configured as an access point wireless modem or as a non-access point wireless modem by switching between the different modes of the executable code and no hardware changes are typically required. Thus, reconfiguration of the wireless modems as access point wireless modem or non-access point wireless modem can be achieved with low complexity.

For a mm wave radio communication mesh network as described, it is essential for the performance that the system is configured appropriately with wireless modems being configured as access point wireless modems or non-access point wireless modems. Such a configuration could be performed manually based on careful analysis and detailed measurements. However, such an approach is not desirable in many scenarios as it requires a substantial manual effort, is time consuming to implement, is prone to suboptimal configuration, and is a static configuration that does not easily adapt to changes in the network, such as when nodes are added, removed, and/or moved.

Therefore, an automatic or semi-automatic configuration would be highly advantageous. Further, a localized approach where each node can configure its wireless modems separate from other nodes would be highly advantageous. Thus, rather than a centralized approach where the whole system is configured, an approach where individual nodes can perform local configurations yet provide an overall efficient configuration of the whole network are highly advantageous.

In the following, an approach of configuring a node of a mm wave radio communication mesh network will be described. The approach may allow node based configuration that may lead to an improved network performance.

Figure 3:
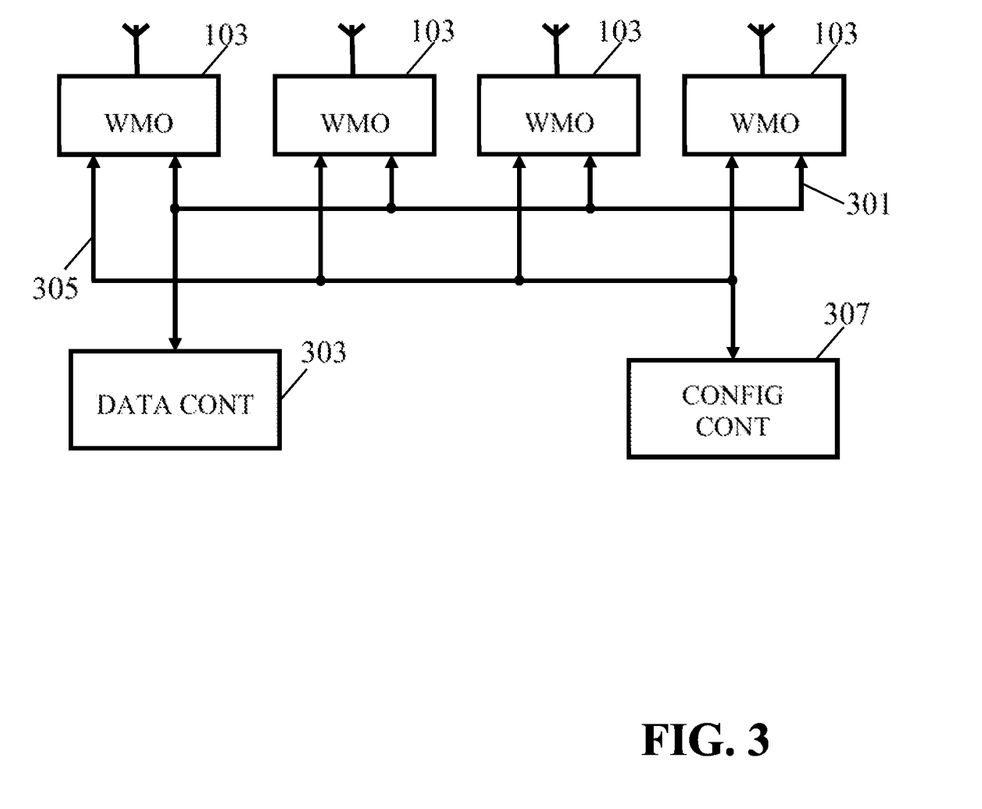
FIG. 3 illustrates an example of elements of a wireless node apparatus for a mm wave radio communication mesh network in accordance with some embodiments of the invention.

FIG. 3 illustrates an example of some elements of a wireless node apparatus for a node of the mm wave radio communication mesh network of FIG. 1 or 2. In the example, the wireless node apparatus comprises a plurality of wireless modems 103, and in particular in the example it comprises four wireless modems 103. Each of the wireless modems 103 use a directional antenna arrangement to form beams, and in the specific example of four wireless modems 103, these may be offset from each other by 90° with the node accordingly forming four sectors.

The wireless node apparatus further comprises a data bus 301 which interconnects the wireless modems 103. The data bus is further coupled to a data controller 303 which may control the data flow in the wireless node apparatus. In operation, the wireless node apparatus may be arranged to receive data using one wireless modem (and thus from one sector/another node) and transmit it from another wireless modem (and thus from another sector/to a different node) thereby enabling the wireless node apparatus to provide the function of a wireless node that can route data between different nodes. The routing of data between appropriate wireless modems 103 may be achieved by the data controller 303 which may also e.g. apply appropriate addressing and other routing functions (routing tables etc.) allowing data to be forwarded to the appropriate node(s).

In addition, the wireless node apparatus comprises a control data bus 305 to which the wireless modems 103 are coupled and which may be used to control the operation of the wireless modems 103. The wireless node apparatus further comprises a configuration controller 307 which is coupled to the control data bus 305 and which is arranged to communicate with the wireless modems using the control data bus 305. The configuration controller 307 may specifically be arranged to control the wireless modems 103 to be configured as access point wireless modems or non-access point wireless modems.

It will be appreciated that although the configuration controller 307 in the example of FIG. 3 is illustrated as being fully separated and remote from the wireless modems 103 and communicating with these over the control data bus 305, the functionality of the configuration controller 307 may in other embodiments be distributed including being partially or fully implemented in the wireless modems 103 themselves.

Figure 4:
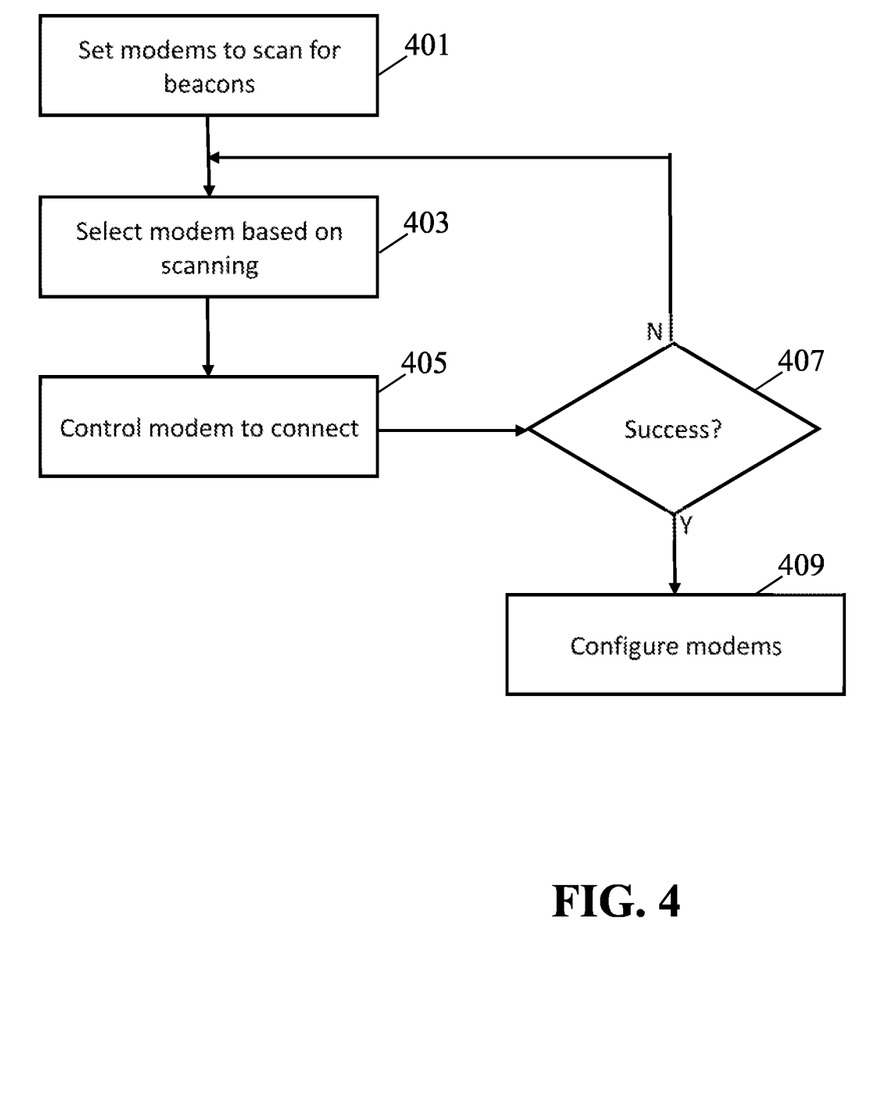
FIG. 4 illustrates an example of a method of operation for a wireless node apparatus for a mm wave radio communication mesh network in accordance with some embodiments of the invention.

FIG. 4 illustrates an example of a flow chart of a method of node configuration that may be performed by the wireless node apparatus, and specifically by the configuration controller 307.

The configuration controller 307 may perform a node configuration at suitable times, such as when the wireless node apparatus is powered on or when specific conditions are detected as will be described in more detail later.

The node configuration includes the configuration controller 307 performing step 401 in which it controls a set of wireless modems of the wireless node apparatus to scan for access point beacons.

The configuration controller 307 may select one or more wireless modems to scan for beacons. For example, it may simply select all wireless modems, may e.g. select all wireless modems that currently do not have any connections with any other nodes, may e.g. select all modes that are currently configured as non-access point wireless modems etc. Various selection criteria will be described in more detail later.

The wireless modems that are selected for scanning are controlled to begin a scanning where a radio receiver seeks to detect any transmitted beacon signals from access point wireless modems that can be received. The mm wave radio communication mesh network may specifically be arranged to use a set of frequency channels and a scanning wireless modem may sequentially try to detect a beacon signal on each of these. For example, for a given frequency channel, the receiver may continuously try to detect a signal and if one is detected, it may seek to demodulate the signal to generate any data that may be modulated onto the signal. If successful, it may evaluate the signal to check if the signal is indeed a beacon signal from an access point wireless modem. If so, the receiver considers a beacon to be detected, and it may proceed to provide relevant information for the beacon to the configuration controller 307. For example, the configuration controller 307 may be provided with information such as signal strength, signal to noise ratio as well as information derived from the demodulated data such as e.g. an identity of the access point wireless modem, preferred communication parameters, properties of the access point wireless modem or the node thereof (e.g. a loading of the node) etc.

After a suitable time ensuring that all beacons of that frequency channel would have been detected, the receiver may move to the next frequency channel and repeat the process for this frequency channel. The receiver may proceed until all possible frequency channels have been scanned.

At the end of step 401, the configuration controller 307 may thus have obtained information on all the beacons that are detected by the scanning modem.

Step 401 is followed by step 403 in which the configuration controller 307 proceeds to determine and typically select a wireless modem for which the scanning has detected an access point beacon from a target access point wireless modem of another node. As will be described in more detail later, different approaches may be used to select the first wireless modem, such as e.g. selecting the wireless modem which has detected the strongest beacon signal.

In some embodiments, the first modem may be selected in accordance with other criteria and considering other parameters, such as a loading of the other node, etc. Various examples will be described in more detail later.

In many embodiments, the selection of the first wireless modem may typically also include the selection of a target access point wireless modem, and thus the configuration controller 307 may in step 403 in some embodiments be arranged to determine/select a wireless modem and target access point combination/pair. Thus, in many embodiments, if a wireless modem detects a plurality of beacons, the configuration controller 307 may in step 403 also select between the access point wireless modems of the detected beacons.

In some cases, only one wireless modem may be set to scan and in such a case the configuration controller 307 may in step 403 simply determine the first wireless modem as the scanning modem as long as it detects a beacon.

If no wireless modem detects a beacon signal the configuration controller 307 may for example terminate the node configuration or may e.g. return to step 401 to select a new set of modems and repeat the process.

Step 403 is followed by step 405 in which the configuration controller 307 controls the first wireless modem to connect to a target access point modem where the target access point modem is a wireless modem of another node for which a beacon has been detected by the first wireless modem. The configuration controller 307 controls the first wireless modem to try to connect to the target access point wireless modem as a non-access point wireless modem and specifically the configuration controller 307 may control the first wireless modem to be configured as a non-access point wireless modem and then to try to attach to the target access point wireless modem.

The first wireless modem may for example be arranged to transmit an attachment message to the access point wireless modem using suitable communication parameters determined from the beacon detection, such as e.g. suitable timing of the transmission. This may lead to a connection/attachment process that results in the first wireless modem connecting to the target access point wireless modem. If the process is not successful, the wireless modem is not connected to the target access point wireless modem.

It will be appreciated that any suitable process for a non-access point wireless modem establishing connection/attachment to an access point wireless modem may be used. For example, when the IEEE 802.11ad standard is followed, the chosen modem is instructed to attempt association beamforming, association and any authentication procedures.

Step 405 is followed by step 407 in which the configuration controller 307 evaluates whether indeed the first wireless modem is successful in connecting/attaching to the target. The first wireless modem may specifically send control data to the configuration controller 307 which indicates whether it has successfully connected to the target access point wireless modem or whether the attempt was unsuccessful.

If the first wireless modem is successful in connecting/attaching to the target access point wireless modem, the configuration controller 307 proceeds to step 409 in which it is arranged to configure one or more of the other wireless modems of the node than the first wireless modem. Specifically, the configuration controller 307 is arranged to configure at least one of the wireless modems that currently do not have any connection as an access point wireless modem. Thus, the configuration controller 307 is arranged to configure at least one of the other wireless modems of the node as an access point wireless modem in response to the first wireless modem establishing connection with the target access point modem as a non-access point wireless modem. Accordingly, in this case, the node will be configured to have at least one non-access point wireless modem and at least one access point wireless modem.

In some embodiments, the configuration controller 307 may be arranged to configure all other wireless modems of the node as access point wireless modems thereby seeking to configure the node to have one non-access point wireless modem that is connected to an access point wireless modem of another node and with the rest of the wireless modems of the node being configured as access point wireless modems that accordingly can be detected and connected to by wireless modems of other sites. In such cases, a mesh may be formed that does not have loops but rather a configuration corresponding to a tree structure can often be achieved.

If the first wireless modem is not successful in connecting/attaching to the target access point wireless modem, the configuration controller 307 may proceed differently in different embodiments. For example, in some embodiments or scenarios, the configuration controller 307 may terminate the node configuration process (and may initiate another node configuration with some delay). In other embodiments or scenarios, the configuration controller 307 may return to step 403 and select a new wireless modem and then repeat the process. In yet other embodiments or scenarios, the configuration controller 307 may for example select a new set of modems to scan for beacons and then repeat the process, or indeed it may select the same process and repeat the process. It will be appreciated that the specific approach taken in case the first wireless modem does not successfully connect is not essential to the described approach.

The described approach allows for a local node configuration to be performed and may allow localized and ad-hoc configuration. This may allow low complexity and substantially facilitated operation and management of the mm wave radio communication mesh network. However, despite the localized node configuration, an efficient network wide mesh and network configuration can typically be achieved. The approach enables an advantageous overall performance in many scenarios.

The approach may for example typically enable a dynamic extension of the mm wave radio communication mesh network where new nodes are configured such that they will attach to another node via a non-access point wireless modem to typically provide a good connection to the existing mesh. It further provides access point wireless modems that allow other nodes to connect to the new node thereby allowing the mesh to expand to further new nodes.

The approach may for example allow a mesh to be formed by a gradual and iterative extension of the mesh network by nodes iteratively detecting other nodes to connect to and providing access point wireless modems to which other nodes can detect. The approach may thus allow a completely unconfigured network to automatically form a mesh network using only node localized configuration processes.

The approach may also be highly suitable for configuring a new node or for adapting an existing node to better connect to other nodes in a mesh.

Figure 5:
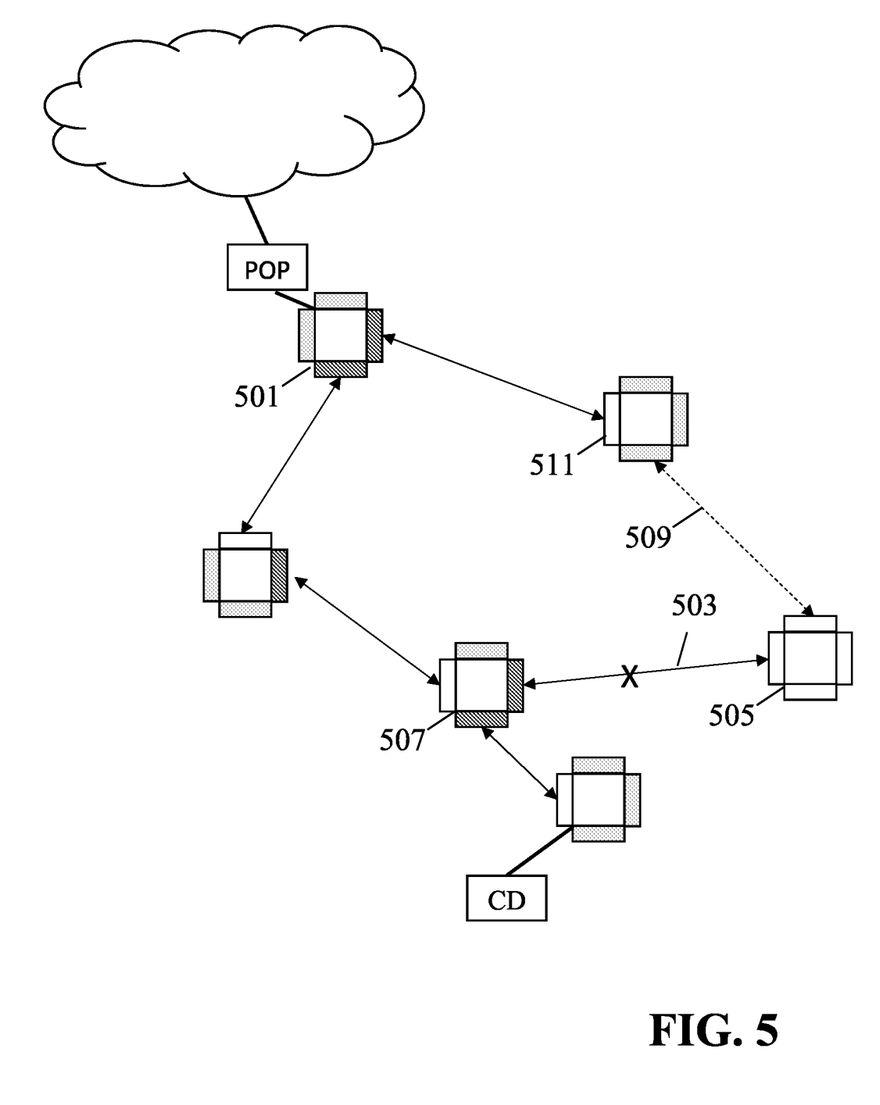
FIG. 5 illustrates an example of elements of a mm wave radio communication mesh network in accordance with some embodiments of the invention.

The approach may also provide a self-healing effect to a mesh network. For example, FIG. 5 illustrates an example of a configuration of the network of FIG. 2 (with no shading for a wireless modem indicating a non-access point wireless modem, light shading indicating an access point wireless modem with no connection, and dark shading indicating an access point wireless modem with one or more connections). In the example, all nodes may initially be connected to at least one other node via a connection from a non-access point wireless modem. The non-access point wireless modem can typically be thought of as providing a connection to the established web. In the example, the only exception is the gateway node 501 which may be a special node that is configured with all wireless modems being access point wireless modems. The gateway node 501 can be considered the key/origin node for the mesh and may therefore be configured differently from other nodes, and specifically may be configured to only include access point wireless modems.

The described configuration approach may be used independently in all the illustrated nodes except for the gateway node 501. In the example of FIG. 5, this has led to scenario in which each node has one non-access point wireless modem node coupled to an access point wireless modem of another node, and with all other wireless modems being configured as access point wireless modems. Thus, all nodes in the example have one connected non-access point wireless modem and (in the example) three access point wireless modems that may be connected or not.

If in the example, a connection 503 between a non-access point wireless modem of a first node 505 and an access point wireless modem of a second node 507 fails/drops, the first node 505 may be isolated and disconnected from the rest of the mesh. However, such a dropped connection from a non-access point wireless modem may in many embodiments be detected and result in an initialization of a node configuration. This may result in a configuration of a wireless modem of the first node 505 as a non-access point wireless modem being connected to an access point wireless modem of another node. This may be the same access point wireless modem and node as the previous connection or may be a new one. Thus, the approach will result in a self-healing where the first node 505 automatically reconnects to the mesh. Indeed, a dropped connection may be due to a suboptimal or unreliable connection and the described approach may result in a new and better connection 509 being formed, e.g. to another node 511.

Different approaches for selecting the first wireless modem and the target access point wireless modem may be used in different embodiments.

In many embodiments, the configuration controller 307 may apply a selection criterion for selecting the first wireless modem and the first target access point that includes a consideration of a signal strength of detected beacons. For example, in many embodiments, all detected beacons, including multiple beacons detected by one wireless modem, may be ranked in order of the detected signal strength of the beacons. In some cases, the selection may then simply select the wireless modem and the target access point wireless modem for which the beacon signal with the highest signal level is detected. In other embodiments, more complex selection criteria may be used including criteria that simultaneously consider other factors.

In some embodiments, the configuration controller 307 may employ a selection criterion for selecting the first wireless modem and the first target access point which includes a consideration of a loading of nodes of the access point wireless modems.

For example, in some embodiments, the access point wireless modems may include data in the transmitted beacons which indicate the current load of the access point wireless modem. For example, the access point wireless modems may transmit an indication of the number of non-access point wireless modems that are currently supported by the access point wireless modem, i.e. specifically how many non-access point wireless modems are currently in the service set of that access point wireless modem.

The selection criterion may in such cases for example bias the selection towards a combination of wireless modem and target access point wireless modem for which the loading is indicated to be lower. Indeed, in some embodiments, the configuration controller 307 may simply select the wireless modem and access point wireless modem for which the access point wireless modem indicates the lowest load.

In some embodiments, the selection criterion for selecting the first wireless modem and the target access point may include a consideration of a number of hops from the access point wireless modems to a given node. The given node may specifically be a gateway node to another network (i.e. specifically a POP or POP-connected node).

It may in some mm wave radio communication mesh networks be desirable for the hop distance to a given node to be kept relatively low. For example, for a backhaul network that connects e.g. Wi-Fi access points or cellular base stations to a core network via a gateway node, it may be desirable for the hop distance to be reduced in order to reduce delay and more effectively use the capacity of the mm wave radio communication mesh network (by reducing the overall number of data transmissions between nodes).

Accordingly, in some embodiments, the access point wireless modems may include data in the transmitted beacons that indicate how many hops there are from the node of the access point wireless modem to the gateway node. Such information may for example be determined by the node by inspecting the mesh topology information or network graph which could be obtained from the routing protocol or by using the Spanning Tree Protocol. Another method is to use network diagnostic tools such as traceroute.

The selection criterion may in such cases for example bias the selection towards a combination of wireless modem and target access point wireless modem for which the number of hops to the gateway node is indicated to be lower. Indeed, in some embodiments, the configuration controller 307 may simply select the wireless modem and access point wireless modem for which the access point wireless modem indicates the lowest number of hops.

It will be appreciated that in many practical embodiments, the selection criterion may be a more complex scenario that considers a plurality of parameters. For example, the configuration controller 307 may select a wireless modem and access point for which the beacon with the highest signal strength is detected subject to the number of hops to the gateway node being below a given threshold and subject to the loading of the access point wireless modem being below a given threshold.

In some embodiments, the selection criterion for selecting the first wireless modem and the target wireless access point may include a consideration of a latency metric. The latency metric may be indicative of a latency for communication of data packets between the target access point wireless modem and another node of the mesh network. The other node may specifically be a gateway node (specifically to another network/to a core network).

The selection criterion may in such cases for example bias the selection towards a combination of wireless modem and target access point wireless modem for which the latency metric is lower. Indeed, in some embodiments, the configuration controller 307 may simply select the wireless modem and access point wireless modem for which the access point wireless modem indicates the lowest latency metric.

The latency metric may specifically be a measurement or estimate of the latency incurred in sending or receiving packet from the wireless access point to a node which specifically may be the gateway node. The metric may e.g. represent the mean latency, or median latency, or maximum latency, or indeed a percentile latency (for example, 99 percentile latency)

The latency may for example be determined by the access point and the gateway exchanging packets that are time-stamped using a common time-base (for example a GNSS derived timebase). Latency may also be determined by exploiting network timing protocols such as IEEE 1588 Precision Time Protocol or Network Time Protocol. In the former residence time values measured by Transparent Clocks may be summed to estimate the latency metric.

The configuration controller 307 may in different embodiments use different approaches to select the set of wireless modems that are set to scan for beacons.

In many embodiments, the configuration controller 307 may be arranged to select the set to include a plurality of wireless modems and thus the ranking and selection of the first wireless modem, and indeed the target access point wireless modem, may be based on whether any out of a plurality of wireless modems can detect any beacons.

For example, in some embodiments, the configuration controller 307 may be arranged to set all wireless modems that currently have not established a connection to perform a scan. In other embodiments, for example, all wireless modems except for potentially one wireless modem configured as an access point wireless modem may be set to scan for modems.

In some embodiments, the set of wireless modems that are set to scan for beacons may be all the wireless modems of the node that are arranged to communicate with other wireless modems using mm wave radio communication links. For example, all mm wave wireless modems that are capable of supporting the mm wave radio communication mesh network are set to scan for beacons. For example, in some embodiments, a full reconfiguration of the node may be performed where all wireless modems are reconfigured and e.g. the arrangement may allow the best (in accordance with a suitable criterion) connection to an access point wireless modem of another node to be formed thereby ensuring a reliable and efficient connection to an existing mesh.

Thus, in many embodiments, the configuration controller 307 may select more than one, and potentially all, wireless modems to scan for beacons in order to potentially connect to an access point wireless modem of another wireless modem. In many cases, this may lead to an improved and/or more reliable connection to another access point wireless modem and an established mesh to be achieved.

In some embodiments, the configuration controller 307 may be arranged to select only a single wireless modem at a time to scan for other beacons. Thus, in some embodiments, the configuration controller 307 may be arranged to determine the set of wireless modems for scanning to include only a single wireless modem. The configuration controller 307 may then perform the process described with reference to FIG. 4 for this wireless modem. The selection of the first wireless modem from the set of scanning modems in this case inherently and automatically identifies the single modem that is performing the scan (as there is only one modem scanning) as long as this modem has detected at least one beacon. If only one beacon is detected, then the target access point wireless modem is selected as the access point wireless modem of that beacon. If more than one beacon is detected, then the considerations described previously may for example be used to select a target access point wireless modem, e.g. the access point wireless modem may be selected based on signal strength, loading and/or number of hops.

In such embodiments, if a connection is successfully formed, the configuration controller 307 may terminate the configuration (typically after having configured one, more, or all of the other wireless modems as an access point wireless modem).

However, if a connection is not successfully formed, either if no beacon is detected or the connection/attachment by the scanning wireless modem is unsuccessful, the configuration controller 307 may in some embodiments terminate the process, but in other embodiments it may proceed to select a new wireless modem and then proceed to repeat the same process for this new wireless modem. Thus, specifically, a new wireless modem may be selected and then the process of FIG. 4 may be repeated for the set of wireless modems set to scan including only this modem.

Thus, in some embodiments, a sequential configuration process may be used where only one wireless modem is scanning at a time. Such an approach may be advantageous in many embodiments by allowing a simpler and less resource demanding process and may further result in reduced interruption to an existing configuration of the node and the mesh.

It will be appreciated that different approaches for sequentially selecting wireless modems for scanning may be used. In many cases, the configuration controller 307 may first select wireless modems that have no connections and subsequently select wireless modems that are configured as non-access point wireless modems. As an example, other parameters, such as the past success in forming suitable links by the individual wireless modems may be taken into account.

In the described example, the configuration controller 307 is arranged to configure at least one of the other wireless modems as an access point wireless modem. This may be particularly advantageous as it may allow the node to configure at least one wireless modem as a non-access point wireless modem and at least one wireless modem as an access point wireless modem. This may allow the node to effectively link into an existing mesh by the detection and attachment to an access point wireless modem of another node. It may further allow that the node transmits a beacon that can be detected by other nodes, i.e. it provides a connection point for other nodes to join (or further develop) the mm wave radio communication mesh network.

In some embodiments, the configuration controller 307 may be arranged to configure all other mm wave radio communication link wireless modems of the node as access point wireless modems when the first wireless modem successfully connects/attaches to an access point wireless modem of another node.

Such an approach may be particularly useful in many embodiments as it maximizes the number of potential access points for wireless modems of new nodes to attach to, and thus it may increase the options for other/new nodes to connect to the mesh via the node being configured.

In other embodiments, the configuration controller 307 may be arranged to only configure a subset of the other wireless modems as access point wireless modems, and in some embodiments it may configure one or more of the remaining wireless modems as a non-access point wireless modem. For example, in some embodiments, the configuration controller 307 may be arranged to configure the remaining wireless modems to achieve a preferred ratio between access point wireless modems and non-access point wireless modems for the node. In many embodiments, the configuration controller 307 may e.g. seek to configure half of the wireless modems of a node as access point wireless modems and half of the wireless modems as non-access point wireless modems. Such approaches may for example allow a mesh to be formed that may include loops in the configuration (such as e.g. illustrated in FIGS. 1 and 2) thereby potentially generating a more robust mesh that may be less vulnerable to links dropping.

The selection of which wireless modems are configured as one or the other may be in accordance with a suitable criterion, such as for example by a random allocation, allocation based on direction of beamform (e.g. selecting oppositely facing wireless modems as the same type), etc.

Such an approach may in many scenarios provide an advantageous performance by allowing a mesh to be developed which is likely to be more robust and form a tighter mesh with more interconnections.

The described configuration approach may provide advantageous operation in such networks and has been found to allow an efficient overall configuration where the nodes may continuously adapt and reconfigure to provide a robust interconnected network. In particular, it has been found that the approach tends to form a well-connected and dense mesh topology. This is advantageous because it provides multiple potential paths through the mesh between any pair of nodes such that if a mmwave link fails on the current communication path between two nodes, traffic can be quickly re-routed onto an alternative (failover) path that uses mmwave links that are already established. Given that mmwave links typically require a line-of-sight connection link failure is a common occurrence when nodes are mobile in a cluttered environment (such as a city or in the countryside with hills, trees and buildings). Link failure may also occur in a mobility scenario when the antenna of a modem reaches the limit of its steerability. The dense mesh is also robust with respect to node failure which is important in many networks. If a node loses connectivity to other nodes of the mesh, the same method is employed to recover connectivity. The method is compatible with point-to-multipoint BSS sets supported by, for example, IEEE 802.11ad.

The configuration controller 307 may be arranged to perform node configuration in different situations and with different intervals in different embodiments. For example, the node configuration may be initiated in response to an event occurring or a specific condition or scenario being detected.

In many embodiments, the configuration controller 307 may be arranged to initialize a node configuration when the node is powered up. When a node is powered up, e.g. for the first time in the current position, the power up process may include the configuration controller 307 performing a node configuration as described. This may provide an efficient approach for introducing a new node to an existing mm wave radio communication mesh network. It may allow the node to automatically configure itself to provide efficient connection to the existing mm wave radio communication mesh network while also providing points to which other wireless modems may connect and attach, i.e. it will both connect to existing nodes and provide a beacon for other nodes to detect.

In some embodiments, the configuration controller 307 may be arranged to perform a node configuration in response to a wireless modem being switched on. In particular, when a wireless modem is switched on the described approach may be used to configure that modem. Alternatively or additionally, the configuration controller 307 may be arranged to perform a complete node configuration including reconfiguring all wireless modems of the node when a new wireless modem is switched on. Such an approach may allow an improved adaptation of the node in many scenarios.

In some embodiments, the configuration controller 307 may be arranged to perform a node configuration in response to receiving a user input. In many embodiments, the configuration controller 307 may be arranged to allow a manual input that starts a node configuration. Thus, a user or operator may manually instigate a new node configuration. Such an approach may facilitate management and operation of a mm wave radio communication mesh network.

In some embodiments, the configuration controller 307 may be arranged to perform a node configuration in response to a time interval expiring. The time interval may specifically be a time interval from the last node configuration. For example, in some embodiments, the time interval may be a fixed repeating time interval and the configuration controller 307 may accordingly be arranged to periodically perform a node configuration. In other examples, the time interval may for example of a (e.g. semi) random duration and the configuration controller 307 may be arranged to perform a node reconfiguration at least partially random intervals. Such approaches may allow an improved adaptation and update of the operation of the mm wave radio communication mesh network.

In some embodiments, the configuration controller 307 may be arranged to perform a node configuration in response to the connections formed by wireless modems of the node, and specifically in response to a detection of a loss of one or more connections from one or more of the wireless modems. In some embodiments, the configuration controller 307 may specifically be arranged to detect that a connection is lost for a given modem.

In some embodiments, the configuration controller 307 may be arranged to initialize a node configuration in response to a detection that all of the connections of the node to other nodes have been lost. Thus, if it is detected that none of the wireless modems form a connection to another node, a node configuration may be initialized to try and establish connections to allow the node to (re)join the mm wave radio communication mesh network.

In some embodiments, the configuration controller 307 may be arranged to initialize a node configuration in response to a detection that all of the connections of the node to access point wireless modems of other nodes have been lost. Thus, in this case, if it is detected that none of the wireless modems form a connection to an access point wireless modem of another node, then a node configuration may be initialized to try and establish a connection to an access point wireless modem. Thus, in this case, a node configuration is performed even if the node has connections with other nodes from wireless modems of the current node that are configured as access point wireless modems. This approach may thus seek to ensure that the node has a connection to another access point wireless modem and is not just itself functioning as access point wireless modems for other nodes. This may reduce the risk of isolated islands forming in the mm wave radio communication mesh network. It may increase the likelihood that all nodes include both access point wireless modems and non-access point wireless modems thereby increasing the likelihood that all nodes end up being interconnected as a result of the node localized node configuration.

In many embodiments, the configuration of a wireless modem as an access point wireless modem includes initializing the access point wireless modem with suitable operational and communication parameters.

In particular, typically the configuration controller 307 may be arranged to allocate a frequency channel to the access point wireless modem. The access point wireless modem may then use this frequency channel to establish connections with non-access point wireless modems of other nodes. The access point wireless modem will typically also transmit a beacon signal on the assigned frequency channel and perform resource management (typically time slot allocation) for the frequency channel.

The configuration controller 307 may consider different parameters and use different selection criteria when selecting the frequency channel for the access point wireless modem.

In some embodiments, the configuration controller 307 may be arranged to select the frequency channel in response to frequency channels used by wireless modems of the plurality of wireless modems configured as non-access point wireless modems. For example, it may specifically be arranged to select a frequency channel that is not used by any non-access point wireless modem (if possible). This may prevent that the access point wireless modem is configured to use the same frequency channel as one that is known to be used by a wireless modem of the current node and which accordingly is likely to be close. Thus, it may reduce the risk of interference between access point wireless modems of different modes and may assist in achieving a suitable frequency plan for the mm wave radio communication mesh network.

In some embodiments, the configuration controller 307 is arranged to select the frequency channel in response to frequency channels of detected access point beacons. In particular, the configuration controller 307 may seek to avoid the frequency channels for which beacons have been detected. In many scenarios, the beacon detection may with relatively high probability detect the access point wireless modems that are likely to be sufficiently close to cause a high interference to the current node, and thereby to communications from other nodes that will connect to the access point wireless modem being initialized. The configuration controller 307 may avoid these detected frequencies (if possible) thereby increasing the probability that a frequency plan with reduced interference may be achieved through a localized frequency channel algorithm In some embodiments, the configuration controller 307 is arranged to select the frequency channel to minimize a number of reuses of frequency channels for the wireless node. For example, when two frequency channels A and B are available to the configuration controller 307 for configuring modems and channel A has been configured to a larger number of modems controlled by the configuration controller 307 as compared to the number of modems to which channel B has been configured, it is advantageous to arrange the configuration controller 307 to select channel B for a newly configured modem or a modem being reconfigured.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Each node, wireless modem, and the configuration controller may may be implemented in any suitable way including e.g. using discrete or dedicated electronics. The configuration controller may for example be implemented as an integrated circuit such as an Application Specific Integrated Circuit (ASIC). In some embodiments, the circuits (including in particular the configuration controller) may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry. In particular, a processing unit (or units) may be used having a processor (such as a CPU or DSP) coupled via a data bus and address bus to memory may provide a hardware platform for executing code stored in the memory. The memory may typically include RAM, ROM, as well as possibly other volatile and non-volatile memory elements. Program code implementing the described principles and approaches may be stored in non-volatile memory, such as ROM, and extracted and executed by the processor. Data used during execution may be temporarily stored on volatile memory, such as RAM.

The processor may further be coupled to a communication interface that allows the processor to interface to a suitable communication medium, such as a data bus or a data network. The communication medium may be used to exchange communication between the configuration controller and wireless modems of the node. A processor unit implementing the configuration controller may be coupled to a communication interface that can communicate with a communication interface of a wireless modem via a suitable communication medium. Similarly, A processor unit implementing a wireless modem may be coupled to a communication interface that can communicate with a communication interface of the configuration controller via a suitable communication medium.

The wireless modems include suitable functionality for mm wave radio links and functions to be performed. The processing unit may specifically be coupled to a radio unit that includes a modulator and upconverter(s) for generating a suitably modulated mm wave signal. A bank of phase rotators may generate a plurality of signals having different relative phases. These signals are fed to a bank/array of antenna elements resulting in a combined beam pattern being formed by the antenna elements. Similarly, for the receiving functionality, the wireless modems include a bank of phase rotators that rotate the received signals from the antenna elements of the antenna array. The phase rotated outputs are combined to generate a combined received signal that due to the phase rotations correspond to a beamform of the antenna array. A demodulator is fed the combined received signal and performs demodulation to generate the received data which is fed to the processing unit for processing. The transmit and receive functions include IF and RF amplifiers throughout the receive and/or transmit paths.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A wireless node apparatus for a node a mm wave radio communication mesh network, the wireless node apparatus comprising:
   a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configurable as an access point wireless modem or as a non-access point wireless modem,
   a wireless modem configured as an access point wireless modem being arranged to form mm wave radio communication links with non-access point wireless modems of other nodes and being arranged to transmit a beacon signal, and
   a wireless modem configured as a non-access point wireless modem being arranged to form mm wave radio communication links with access point wireless modems of other nodes and not being arranged to transmit a beacon signal;
   a configuration controller arranged to perform a node configuration comprising:
   controlling a set of wireless modems of the plurality of wireless modems to scan for access point beacons;
   determining a first wireless modem from the set of wireless modems, the first wireless modem being a wireless modem having detected an access point beacon from a first target access point wireless modem;
   controlling the first wireless modem to connect to the first target access point modem, the first wireless modem being configured as a non-access point wireless modem; and
   configuring at least one wireless modem of the plurality of wireless modems other than the first wireless modem as an access point wireless modem in response to the first wireless modem establishing connection with the first target access point modem.

2. The wireless node apparatus of claim 1, wherein determining the first wireless modem comprises selecting the first wireless modem and the first target access point out of a plurality of pairs of wireless modems and target access points for which a beacon has been detected.

3. The wireless node apparatus of claim 2, wherein a selection criterion for selecting the first wireless modem and the first target access point includes a consideration of a signal strength of detected beacons.

4. The wireless node apparatus of claim 2, wherein a selection criterion for selecting the first wireless modem and the first target access point includes a consideration of a loading of nodes of at least one of the access point wireless modems from which a beacon has been detected.

5. The wireless node apparatus of claim 2, wherein a selection criterion for selecting the first wireless modem and the first target access point includes a consideration of at least one of a latency metric for the access point wireless modems and a number of hops from the access point wireless modems to a given node.

6. The wireless node apparatus of claim 1, wherein the set of wireless modems comprises all wireless modems of the node that are arranged to communicate using mm wave radio communication links formed with wireless modems of other nodes.

7. The wireless node apparatus of claim 1, wherein the set of wireless modems comprises more than one of the wireless modems of the plurality of wireless modems.

8. The wireless node apparatus of claim 1, wherein the set of wireless modems comprises only one wireless modem of the plurality of wireless modems, and the configuration controller, in response to no connection being formed between first wireless modem and the first target access point for the wireless modem, is arranged to:
control the different wireless modem to connect to a second target access point modem in response to a detection of a beacon from the second target access point modem, the different wireless modem being configured as a non-access point wireless modem; and
configure at least one wireless modem of the plurality of wireless modems other than the different wireless modem as an access point wireless modem in response to the different wireless modem establishing connection with the second target access point modem.

9. The wireless node apparatus of claim 1, wherein the configuration controller, in response to no connection being formed between first wireless modem and the first target access point for the wireless modem, is arranged to:
select a second wireless modem from the set of wireless modems, the second wireless modem being a wireless modem having detected a beacon from a second target access point wireless modem, the second wireless modem being different than the first wireless modem;
control the second wireless modem to connect to the second target access point modem, the second wireless modem being configured as a non-access point wireless modem; and
configuring at least one wireless modem of the plurality of wireless modems other than the second wireless modem as an access point wireless modem in response to the second wireless modem establishing connection with the second target access point modem.

10. The wireless node apparatus of claim 1, wherein the configuration controller is arranged to configure all wireless modems of the plurality of wireless modems other than the first wireless modem as an access point wireless modem in response to the first wireless modem establishing connection with the first target access point.

11. The wireless node apparatus of claim 1, wherein the configuration controller is arranged to configure a subset of wireless modems of the plurality of wireless modems other than the first wireless modem as an access point wireless modem in response to the first wireless modem establishing connection with the first target access point.

12. The wireless node apparatus of claim 1, wherein the configuration controller is arranged to initiate the node configuration in response to at least one of:
a switching on of the wireless node apparatus;
a switching on of a wireless modem of the plurality of wireless modems;
a user input;
a time interval expiring;
a loss of all connections to access point wireless modems of other nodes;
a loss of all connections to other nodes.

13. The wireless node apparatus of claim 1, wherein the configuration controller is arranged to allocate a frequency channel to a wireless modem of the plurality of wireless modems when being configured as an access point wireless mode.

14. The wireless node apparatus of claim 13, wherein the configuration controller is arranged to select the frequency channel in response to frequency channels used by wireless modems of the plurality of wireless modems configured as non-access point wireless modems.

15. The wireless node apparatus of claim 14, wherein the configuration controller is arranged to select the frequency channel as a frequency channel that is not used by wireless modems of the plurality of wireless modems configured as non-access point wireless modems.

16. The wireless node apparatus of claim 13, wherein the configuration controller is arranged to select the frequency channel to minimize a number of reuses of frequency channels for the wireless node.

17. The wireless node apparatus of any of claim 13, wherein the configuration controller is arranged to select the frequency channel in response to frequency channels of detected access point beacons.

18. A mm wave radio communication mesh network comprising a plurality of wireless nodes of which one node is a gateway node to a network and at least one node comprises a wireless node apparatus, the wireless node apparatus comprising:
a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configurable as an access point wireless modem or as a non-access point wireless modem,
a wireless modem configured as an access point wireless modem being arranged to form mm wave radio communication links with non-access point wireless modems of other nodes and being arranged to transmit a beacon signal, and
a wireless modem configured as a non-access point wireless modem being arranged to form mm wave radio communication links with access point wireless modems of other nodes and not being arranged to transmit a beacon signal;
a configuration controller arranged to perform a node configuration comprising:
controlling a set of wireless modems of the plurality of wireless modems to scan for access point beacons;

determining a first wireless modem from the set of wireless modems, the first wireless modem being a wireless modem having detected an access point beacon from a first target access point wireless modem;

controlling the first wireless modem to connect to the first target access point modem, the first wireless modem being configured as a non-access point wireless modem; and configuring at least one wireless modem of the plurality of wireless modems other than the first wireless modem as an access point wireless modem in response to the first wireless modem establishing connection with the first target access point modem.

19. The mm wave radio communication mesh network of claim 18, further comprising:

a gateway node arranged to couple the mm wave radio communication mesh network to another network, the gateway node comprising a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configured as an access point wireless modem.

20. A method of operation for a wireless node of a node a mm wave radio communication mesh network, the wireless node comprising:

a plurality of wireless modems arranged to communicate using mm wave radio communication links formed with wireless modems of other nodes, at least some wireless modems of the plurality of wireless modems comprising a directional antenna arrangement having directional beams formed in different directions, each wireless modem of the plurality of wireless modems being configurable as an access point wireless modem or as a non-access point wireless modem, a wireless modem configured as an access point wireless modem being arranged to form mm wave radio communication links with non-access point wireless modems of other nodes and being arranged to transmit a beacon signal, and a wireless modem configured as a non-access point wireless modem being arranged to form mm wave radio communication links with access point wireless modems of other nodes and not being arranged to transmit a beacon signal;

and the method comprising:

controlling a set of wireless modems of the plurality of wireless modems to scan for access point beacons;

determining a first wireless modem from the set of wireless modems, the first wireless modem being a wireless modem having detected an access point beacon from a first target access point wireless modem;

controlling the first wireless modem to connect to the first target access point modem, the first wireless modem being configured as a non-access point wireless modem; and configuring at least one wireless modem of the plurality of wireless modems other than the first wireless modem as an access point wireless modem in response to the first wireless modem establishing connection with the first target access point modem.

* * * * *